US010643258B2

(12) United States Patent
Kurnit et al.

(10) Patent No.: US 10,643,258 B2
(45) Date of Patent: May 5, 2020

(54) DETERMINING COMMERCE ENTITY PRICING AND AVAILABILITY BASED ON STYLISTIC HEURISTICS

(71) Applicant: Keep Holdings, Inc., New York, NY (US)

(72) Inventors: Scott Philip Kurnit, New York, NY (US); Charles Myslinsky, Brooklyn, NY (US); Ryan Quigley, Greenport, NY (US); Mark Tozzi, Berkeley Springs, WV (US); Scott Craig Germaise, Stamford, CT (US)

(73) Assignee: KEEP HOLDINGS, INC., New York, NY (US)

( * ) Notice: Subject to any disclaimer, the term of this patent is extended or adjusted under 35 U.S.C. 154(b) by 823 days.

(21) Appl. No.: 14/977,330

(22) Filed: Dec. 21, 2015

(65) Prior Publication Data

US 2016/0189255 A1    Jun. 30, 2016

Related U.S. Application Data

(60) Provisional application No. 62/096,836, filed on Dec. 24, 2014.

(51) Int. Cl.
*G06Q 30/02* (2012.01)
*G06Q 30/06* (2012.01)
*G06F 17/00* (2019.01)
*G06N 20/00* (2019.01)

(52) U.S. Cl.
CPC ..... *G06Q 30/0283* (2013.01); *G06Q 30/0623* (2013.01); *G06Q 30/0641* (2013.01); *G06F 17/00* (2013.01); *G06N 20/00* (2019.01)

(58) Field of Classification Search
CPC .................................................. G06Q 30/0283
See application file for complete search history.

(56) References Cited

U.S. PATENT DOCUMENTS

| 6,714,933 B2 * | 3/2004 | Musgrove ......... G06F 17/30864 |
| | | 705/26.2 |
| 7,945,627 B1 * | 5/2011 | Musat .................. G06Q 10/107 |
| | | 709/200 |

(Continued)

OTHER PUBLICATIONS

Issie Lapowsky, "This App crawls the Web to get you the best deal on almost any product", Aug. 15, 2014, Wired. (Year: 2014).*

*Primary Examiner* — Michael Misiaszek
*Assistant Examiner* — Jason B Warren
(74) *Attorney, Agent, or Firm* — Fenwick & West LLP

(57) ABSTRACT

Disclosed is a system and method for determining pricing and availability of e-commerce entities. The determination includes accessing a web page that includes an entity of interest and generating a visual map representation of the web page that includes elements related to the entity's pricing/availability and stylistic identifiers that are applied to those elements. Stylistic identifiers are pricing/availability identifiers based on stylistic heuristics. Certain elements are identified as candidate elements and a likelihood that a candidate element is pricing/availability element of the entity is determined for the candidate elements. A candidate element is selected as the pricing/availability element of the entity by analyzing the determined likelihood of various candidate elements.

27 Claims, 6 Drawing Sheets

(56) References Cited

U.S. PATENT DOCUMENTS

| | | | | |
|---|---|---|---|---|
| 8,051,372 B1* | 11/2011 | Sandhaus | ......... | G06F 17/30911 |
| | | | | 707/999.104 |
| 8,880,498 B2* | 11/2014 | Rubanovich | ......... | G06F 16/951 |
| | | | | 707/709 |
| 2008/0033996 A1* | 2/2008 | Kesari | ................... | G06F 17/212 |
| 2008/0140606 A1* | 6/2008 | Clark | ............... | G06F 17/30864 |
| 2009/0265611 A1* | 10/2009 | Sengamedu | ........ | G06F 16/9577 |
| | | | | 715/234 |
| 2009/0327064 A1* | 12/2009 | Ku | ........................ | G06Q 30/02 |
| | | | | 705/14.23 |
| 2010/0153187 A1* | 6/2010 | Ghani | ................... | G06Q 30/02 |
| | | | | 705/14.53 |

* cited by examiner

DETERMINING COMMERCE ENTITY PRICING AND AVAILABILITY BASED ON STYLISTIC HEURISTICS

CROSS REFERENCE TO RELATED APPLICATION

This application claims the benefit of U.S. Provisional Application No. 62/096,836, filed Dec. 24, 2014, which is incorporated by reference in its entirety.

BACKGROUND

Field of Art

The disclosure generally relates to the field of electronic transactions.

Description of Art

Electronic commerce (e-commerce) enables trading in entities (e.g., products or services) using computer networks, such as the Internet. Users are able to purchase entities on e-commerce websites provisioned by e-commerce retailers. Users typically use generic or shopping specific search engines to identify various entities of interest to them. Such search engines typically are inconsistent while displaying entity information and display entity information such as pricing information in different formats. Upon finding an entity of interest, a user may either purchase the entity immediately or save the entity information into a wish list for a future purchase. The wish list may be provisioned by either the retailer selling the entity or a third-party (i.e., a party other than the retailer selling the entity).

A problem with saving entity information at a third-party's wish list is an inability of the third-party to update the entity's pricing and availability information accurately in response to changes to the entity's pricing and/or availability. The problem is exacerbated when a format used for displaying pricing information varies from one website to another, or when an e-commerce web page includes multiple pricing elements within a single web page. The problem is also exacerbated when the third-party has to track entities of many different websites.

Conventional methods for determining pricing (and/or availability) information for an entity saved at a third-party's wish list typically include analyzing only the text of the entity information. An analysis of only the text of the entity information cannot distinguish between entity pricing (and/or availability) information in different formats originating at different e-commerce websites. Additionally, analysis of only the text irrespective of where the text is located on a web page would not distinguish between two entities located at two different locations on the web page (e.g., above the fold vs. below the fold). The conventional methods, in some cases, may provide incorrect pricing and availability information to users.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
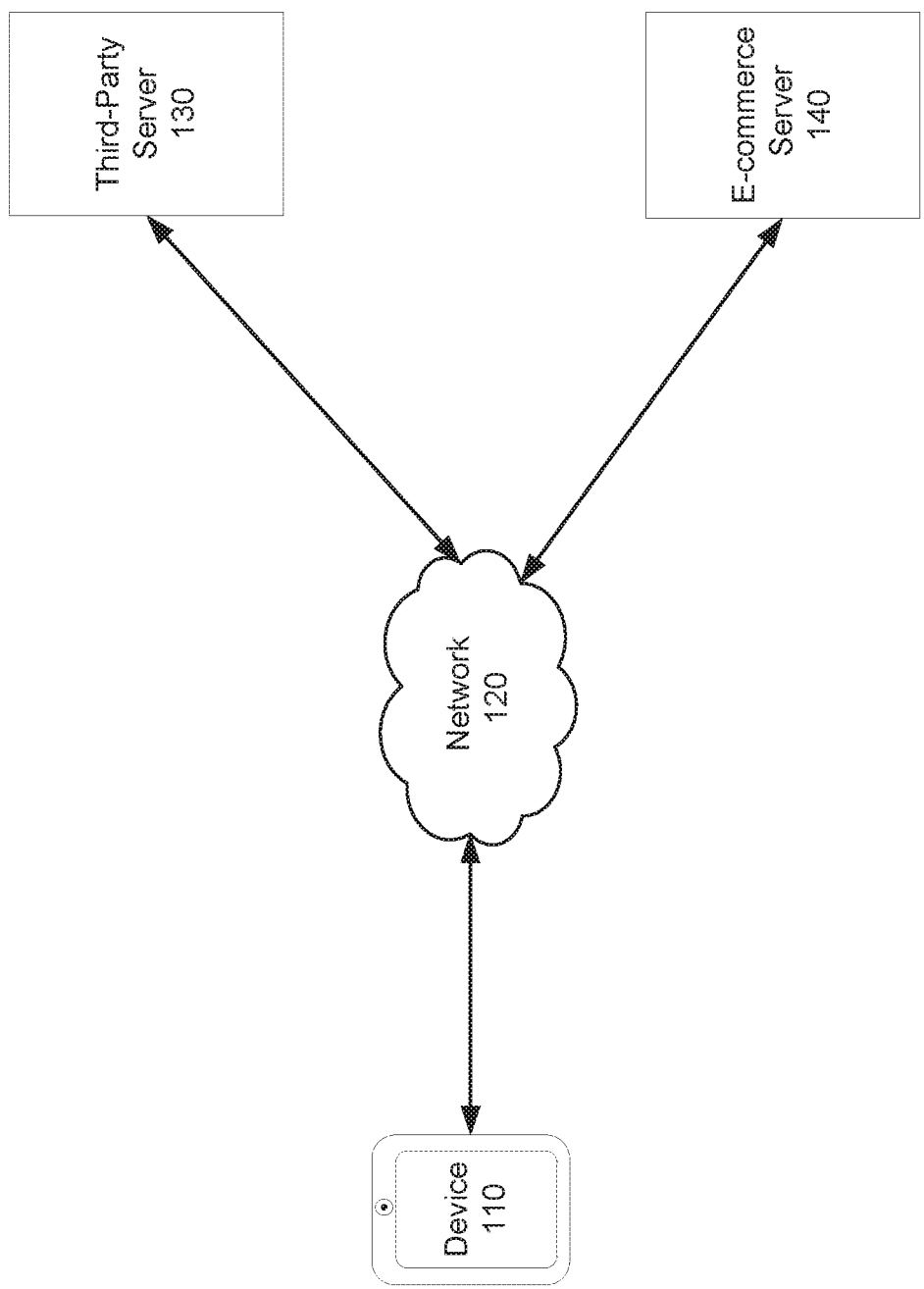
FIG. 1 illustrates a block diagram of an example system environment implementing pricing and availability determination for an e-commerce entity.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is an application for determining pricing and availability of electronic commerce (e-commerce) products or services (i.e., e-commerce entities) on e-commerce web pages by using stylistic heuristics in addition to the text of the web pages as opposed to conventional techniques that only analyze text. Heuristics are experience based techniques allowing for solutions that meet goals and are used here to determine entity pricing and availability. The application may be implemented as a system, method and/or a computer program product (e.g., a computer readable storage medium that stores instructions executable by one or more processing units).

In an example scenario, a user, through a user account, visits various e-commerce web pages of various shopping websites through an application on a mobile device such that the user may save all interested entities in a repository within the application for later use. An entity as described herein represents a product or service that may be purchased over an e-commerce web page. A server hosting the application, for example, initiates a method to determine entity pricing and/or entity availability (hereinafter "entity pricing/availability") either at a request of the user (e.g., when user provides an input to add an entity to the cart for purchase) or automatically without such request by the user. The method includes accessing an e-commerce web page that includes the entity of interest and retrieving the necessary information from the web page. A visual map representation of the web page is generated and rendered (either via an application on a mobile device or a web browser) to include only those elements of the rendered web page that are relevant to entity pricing/availability. For the elements in the visual map representation, stylistic identifiers (e.g., price labels, availability labels etc.) associated with entity pricing/availability are applied such that the elements that include certain specific stylistic identifiers are identified as candidate elements related to entity pricing/availability. An example stylistic pricing identifier is a currency symbol and an example stylistic availability identifier is a string of characters such as 'add to cart.'

Each candidate element is analyzed to check whether the candidate element is canonical in metadata as a pricing/availability element. Upon determination that the candidate element is canonical as a pricing/availability element, the candidate element is identified as the pricing/availability element of the entity of interest. However if it is determined that the candidate element is not canonical, a likelihood that the candidate element is the pricing/availability element is determined. The likelihood is determined by assigning a weighting factor for stylistic attributes of the candidate element and computing a weighted score for the candidate element. A machine learning model or a rules-based model is used to determine the weighting factors of the attributes. Example stylistic attributes include one or more of: position, price, microdata, tree similarity, X-axis sharing, Y-axis sharing, text length, font size, text style, and text content. After determining a likelihood (e.g., by computing weighted score) for candidate elements, one of the candidate elements is selected as the pricing/availability element of the entity of interest.

In one embodiment, the server provides the pricing/availability information of the selected candidate element to the device of the user and/or stores the information in the user's repository (e.g., a repository associated with an account of the user). In one embodiment, the server selects an additional candidate element as a pricing/availability element of an additional entity, where the additional entity is at least one of: a useful addition to the entity of interest (e.g., cross-selling), a more expensive version of the entity of interest (e.g., up-selling), and a less expensive version of the entity of interest (e.g., down-selling).

Example advantages of the method include providing an indication to the user whether the entity of interest at the specified web page is available for purchase at a later time than when the user added the entity to the repository; providing up-to-date pricing information for the entity of interest to the user; and extracting the necessary entity information to determine entity pricing/availability for all entities of interest that the user saved in the user's repository, where the entities may be located on different domains of e-commerce websites.

Example System Environment

FIG. 1 illustrates a block diagram of an example system environment 100 implementing a determination of an e-commerce entity's pricing/availability information. System 100 includes an electronic device 110, a third-party server 130, an e-commerce server 140, and a network 120 used for communication between the device 110 and the servers (i.e., third-party server 130 and e-commerce server 140). In one embodiment, the e-commerce server 140 hosts an e-commerce website (including various e-commerce web pages) that include entities for purchase, and third-party server 130 hosts an application associated with a third-party (hereinafter "third-party application") that runs on the device 110 and may save a user's interested entities in a user's wish list (or a repository) such as a repository associated with an account of the user.

In an example scenario, the user of the device 110 first invokes the third-party application on the device 110 to execute the application on the device 110. The application allows the user to access e-commerce websites to perform e-commerce transactions from within the application's user interface using an account of the user. The user access one or more e-commerce websites, and wish to save one or more entities at a repository associated with the user (e.g., a repository associated with an account of the user) and maintained by the third-party.

An entity as described herein represents a product or service that may be purchased over an e-commerce web page. In one embodiment, the entity represents a product with physical manifestation and is configurable in various attributes of the product. Example configurable attributes include size, color, size type, size system, age group, gender, product category, luster, product attributes such as number of carets of a diamond, diameter, condition (new, used, etc), width, height, material, and depth. Alternatively, the entity represents a product without physical manifestation, a product downloadable from a network, a product representing a subscription service, or a product representing a digital gift. An entity may also represent a group of products (or services) such that pricing information of the group of products (or services) represents a bundled price for the group of products (or services).

The device 110 is an electronic device, such as cell phone, smart phone, desktop phone with or without a display, audio and/or video conferencing device, tablet, computer, gaming console, or any device that has a capability to access e-commerce websites, to provide for display information from the websites, and to enable a user to perform e-commerce transactions using an account associated with the user. The device 110 includes, among other components, a processor to execute instructions and a memory module to store data. The memory module of the device 110 stores data while the device is being used for transactions on e-commerce websites. The memory module may include high-speed random access memory and/or non-volatile memory, such as one or more magnetic disk storage devices, one or more optical storage devices, and/or flash memory (e.g., NAND, NOR). The memory module may store an operating system such as Darwin™, RTXC™, LINUX™, UNIX™, OS X™ WINDOWS™, ANDROID, or an embedded operating system such as VxWorks™. The operating system may include instructions for handling basic system services and for performing hardware dependent tasks. In some implementations, the operating system may be a kernel (e.g., UNIX™ kernel). The memory module may also store communication instructions to facilitate communicating with one or more additional devices, one or more computers and/or one or more servers (e.g., third-party server 130 and e-commerce server 140).

Network 120 allows the device 110 to interact with third-party server 130 and e-commerce server 140. In an example embodiment, the network 120 uses standard communications technologies and/or protocols. Thus, network 120 may include links using technologies such as Ethernet, 802.11 standards, worldwide interoperability for microwave access (WiMAX), WiFi, 3G, digital subscriber line (DSL), etc. The data exchanged over the network 120 may be represented using technologies and/or formats including the hypertext markup language (HTML), the extensible markup language (XML), etc.

Third-party server 130 is coupled to the device 110 via the network 120 for communicating with the device 110 while the user is operating the third-party application. In one embodiment, the third-party server 130 operates in a client-server architecture, where the third-party server 130 serves client devices, such as device 110, based on any requests received from the client devices. Some of the functions that third-party server 130 may perform include receiving, hosting, storing, and providing data associated with the user of the client devices. For example, the third-party server 130 may be an application server. The third-party server 130 comprises multiple components similar to the components of the example machine described below in detail with reference to FIG. 6.

E-commerce server 140 is coupled to the device 110 and the third-party server 130 via the network 120 for facilitating access to any e-commerce web site that the user uses to perform e-commerce transactions. In one embodiment, the user accesses the e-commerce websites from within the third-party application. Alternatively, the user accesses the e-commerce website from outside of the third-party application. In one embodiment, the e-commerce server 140 operates in a client-server architecture, where the e-commerce server 140 serves client devices, such as device 110, by providing web pages using hypertext transfer protocol based on any requests received from the client devices. The web pages can be provided such that the data presented on a web page can also be provided for display within a mobile application (without necessarily needing a web browser) executing on a device such as, for example, a smartphone, a tablet, and the like. Some of the functions that the e-commerce server 130 may perform include receiving, hosting, storing, and providing data associated with the e-commerce websites used in the e-commerce transactions. For example, the e-commerce server 140 may be a web server.

Example Entity Pricing and Availability Determination

Figure 2:
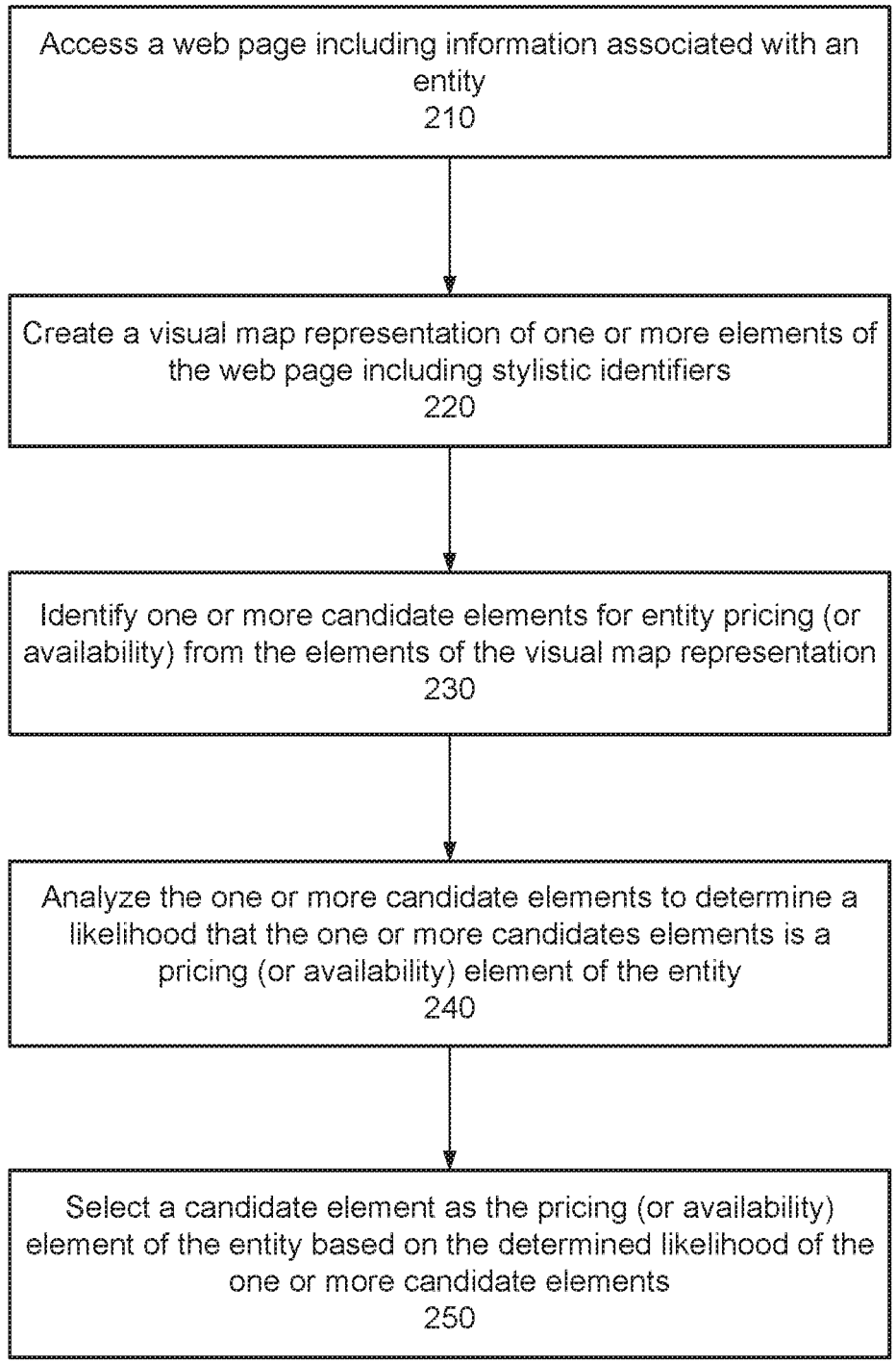
FIG. 2 is a flowchart of an example process for determining pricing and availability information for an e-commerce entity.

FIG. 2 is a flowchart of an example process 200 for determining pricing and availability information for an e-commerce entity. In an example scenario, a user of a device (e.g., device 110) accesses an e-commerce web page of an e-commerce website to purchase an entity through a third-party application running on the device. The user has an account with the third-party that the user might have created while registering for their service. The user may sign-in to the user's account before accessing the e-commerce website such that the third-party application may communicate with the e-commerce website while the user is performing transactions.

While performing transactions on the e-commerce web page (e.g., purchasing one or more entities), the user saves information associated with the one or more entities at a repository associated with the user's account and maintained by the third-party. For example, when the user identifies an entity of interest on a web page, the user might wish to save the entity's information for future purchase as opposed to buying it immediately. In such scenario, the user may save the entity's information at the user's repository (i.e., a repository associated with an account of the user) maintained by the third-party. The web page including the entity of interest may also contain other entities that the user might or might not be interested in. The saved entity information includes at least an identifier of the entity's web page. For example, the entity's web page identifier is a universal resource identifier (URI). An URI is a string of characters used to identify a name or a resource on the Internet. A URI identifies a resource either by a location such as universal resource locator (URL), or a name such as universal resource identifier (URI), or both. A URL is a subset of the URI that specifies where an identified resource (e.g., entity's web page) is available and the mechanism for retrieving the web page. That is, a URL defines how the web page may be accessed. While URLs most commonly are used to refer to web pages (e.g., http), URLs may also be used for file transfer (e.g., ftp), email (e.g., mailto), database access (e.g., JDBC), and other applications. A URN is a URI that uses the URN scheme, and does not imply availability of the identified resource. The user's repository is hosted and maintained by a server of the third-party (e.g., third-party server 130). Each of the tasks detailed in the example process of FIGS. 2-5 are implemented by one or more components of the server.

The server accesses 210 a web page associated with an entity that was saved within the user's repository to retrieve information associated with the saved entity. The server retrieves a URI of the entity from the user's repository to identify and locate the web page of the entity. For example, the server retrieves the URL of the web page associated with the saved entity from the repository and accesses the web page. The server may access the web page either automatically or in response to the user's request. In one embodiment, the user places a request to initiate a purchase of the entity saved in the user's repository (e.g., user selects, clicks or touches (on a touch sensitive display)) 'buy' button). Upon receiving such request, the server retrieves the URL of the web page to access the web page. Alternatively, the server may retrieve the URL to access the web page periodically based on either the user's settings or other means without the user having to place any request to initiate the purchase. By periodically accessing the web page, the server may update the pricing and availability information of the entity on a regular basis to provide accurate information to the user. In one embodiment, the server deploys a web crawler to access the web page and extract entity information.

After accessing 210 the entity's web page, the server generates 220 a visual map representation of the web page that includes one or elements of the web page. The visual map representation is used for determining pricing and availability information of the entity. The visual map representation includes one or more elements of the web page, where each element represents pricing information, availability information, or some other information of the entity. The visual map captures the relative positions of the elements of the web page. Each element of the web page includes stylistic identifiers for pricing/availability. For example, stylistic identifiers for pricing include price labels. An example process of generating 220 visual map representation is described below in further detail with reference to FIG. 3.

Example Visual Map Representation

Figure 3:
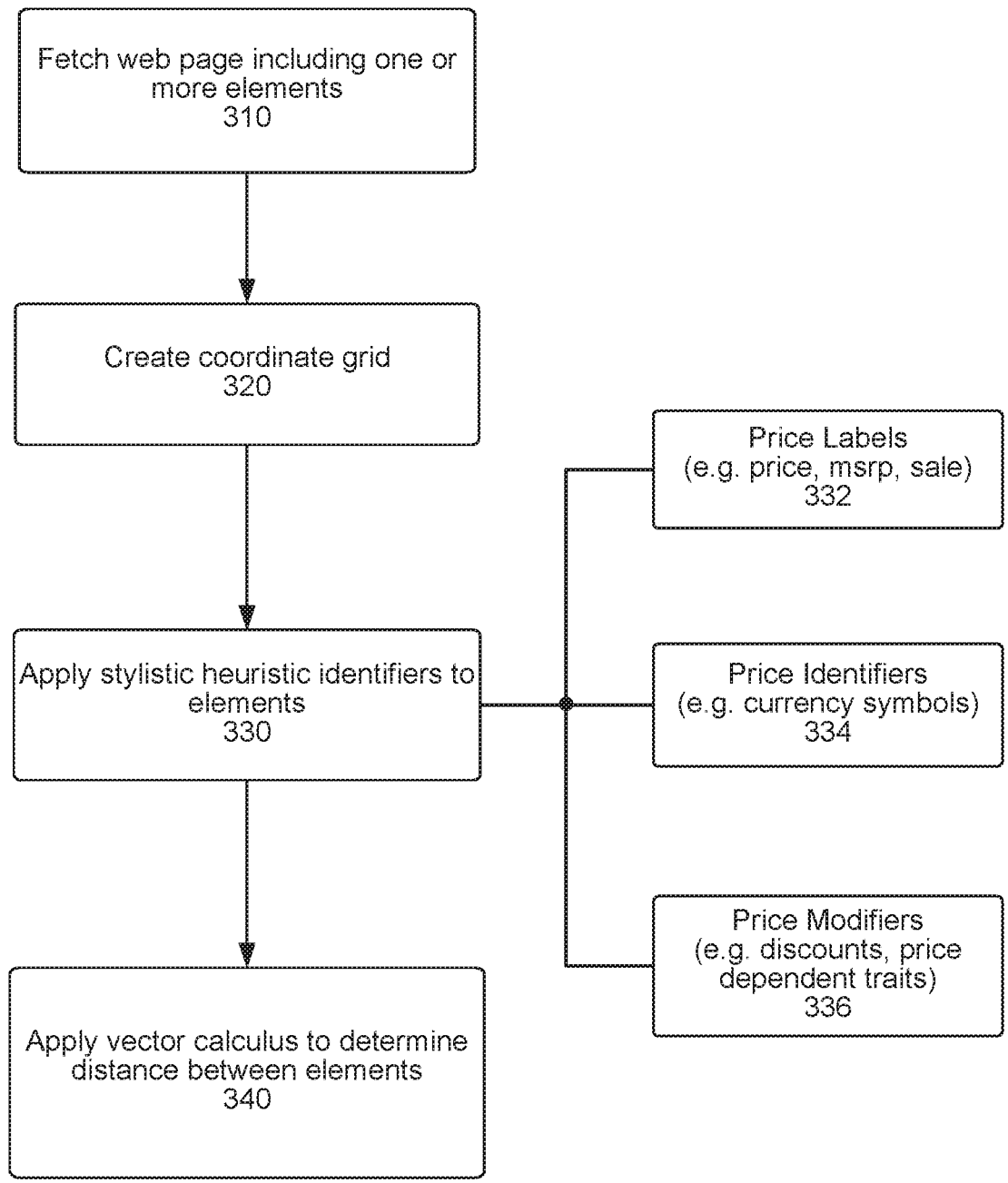
FIG. 3 is a flowchart of an example process for generating a visual map representation of an e-commerce page displaying the e-commerce entity.

FIG. 3 is a flowchart of an example process 300 for generating a visual map representation of an e-commerce web page displaying the e-commerce entity. The process begins with fetching 310 the web page in response to the server accessing 210 the web page. The fetched web page includes one or more entities for sale (e.g., user's entity of interest saved in the repository) and is used to generate the visual map representation of the web page. The server identifies various elements included in the web page that are associated with either entity pricing or availability information as candidate elements, which are further described below with reference to FIG. 4.

After fetching 310 the web page, the server uses the source code of the web page to generate the visual map representation. In one embodiment, the server executes source code associated with the elements of the web page.

For example, the server executes JavaScript code for all elements of the web page if JavaScript language is used for generating such elements. After executing the code for the elements of the web page, the server eliminates unnecessary information from the web page to generate the visual map representation. This includes, for example, deleting code associated with various headers, social links, advertisements, and the like.

The server generates 320 a coordinate grid for the visual map representation. In one embodiment, the coordinate grid includes a horizontal axis and a vertical axis in a Cartesian coordinate system to be able to represent each element as a unique position on the grid. For example, a position of an element of the web page may be represented with horizontal axis (e.g., X-axis) and vertical axis (e.g., Y-axis) coordinates. The server applies 330 stylistic heuristic identifiers to each of the elements of the web page based on the stylistic identifiers of the elements on the web page. Stylistic heuristic identifiers may relate to either pricing or availability of the entity. Example stylistic pricing identifiers may relate to price labels 332, price identifiers 334, and price modifiers 336. Example price labels are labels such as price, msrp (i.e., manufacturer suggested retail price), sale, and the like. Example price identifiers include currency symbols such as dollar symbol or other currency symbols. Example price modifiers include discounts and price dependent traits found in the elements. Example stylistic availability identifiers may relate to availability identifiers (not shown). Example availability identifiers include a string of characters such as 'add to cart,' 'buy,' 'availability,' 'status,' 'in-stock,' or 'out-of-stock.'

The server determines 340 a distance between various candidate elements of the visual map. In one embodiment, the distance is determined using vector calculus by using vector algebraic operations such as vector addition and scalar multiplication. A vector includes a magnitude and direction components. The determined vector distance (e.g., Euclidean distance) represents a relative magnitude of distance and direction between various elements of the visual map. For example, a relative magnitude between a first candidate pricing element including a first price information and a second candidate pricing element including a second pricing information is determined. The direction component of the distance vector between the various elements is also determined. By analyzing the magnitude and direction of the distance between the various elements, the server may determine a likelihood that each of the one or more entities of the web page is the entity of interest for the user. Even in embodiments that include only one entity on the web page, analyzing the vector distances between the different elements helps in determining the entity's pricing and/or availability as described below with reference to FIGS. 4 and 5.

The visual map representation is a simplified version of the web page including various elements of the web page that are related to either entity pricing or entity availability, and not including some elements that are not relevant to the entity pricing/availability. The visual map includes various stylistic attributes of the elements including one or more of: position within the visual map, price value, hierarchical address to retrieve the price candidate, font size, text length, text style, and text content. The visual map representation includes an absolute position of the elements on the coordinate grid (e.g., X- and Y-coordinates) and a relative position between the various elements (e.g., vector distance between two elements). The absolute and relative position may be used in determining entity pricing/availability through various stylistic attributes described below with reference to FIGS. 4 and 5.

The visual map representation is a local copy of the web page that comprises a subset of the elements of the web page, where the subset elements are relevant to entity pricing/availability. For each entity that the user expresses interest in (e.g., by providing an input to save the entity for future use), a visual map representation of the web page associated with the entity of interest is generated by including any elements of the web page that are relevant to entity pricing/availability. In some embodiments, the elements included in the generated visual map representation may be positioned at locations different from their respective locations in the web page. The generated visual map representation is saved in a repository associated with an account of the user for future use. One advantage of the generating and saving the visual map representation in a user's repository is that the user can simply refer to her repository to verify pricing/availability information of the entity instead of having to remember an address for accessing the web page that includes the entity of interest. Because the server, in one embodiment, can periodically update the visual map representation automatically, the user need only refer to the visual map representation in her repository for the latest pricing/availability information. This is even more advantageous for the user if the user has more than one entity of interest associated with distinct web pages because the user can rely on her single repository for latest pricing/availability information for multiple entities instead of having to visit multiple distinct web pages for such information.

The disclosed configuration also beneficially conveys up-to-date pricing/availability information of one or more e-commerce entities that a user is interested in without the user having to repeatedly visit the web pages that include the one or more entities only arises in the realm of computer networks and is unique to the Internet. The system is configured to efficiently provide access to information by being configured to generate a copy of a web page that includes one or more entities that a user is interested in, saving the generated copy in a local repository associated with the user, and periodically refreshing the generated copy of the web page such that the user can refer to the latest refreshed copy of the web page in her repository instead of accessing the actual web page.

Referring back to FIG. 2, the server identifies 230 one or more candidate elements from the elements of the visual map representation. The candidate elements may be either pricing elements or availability elements. An example process of identifying 230 candidate pricing elements or candidate availability elements is described below in further detail with reference to FIG. 4.

Example Identification of Candidate Elements

Figure 4:
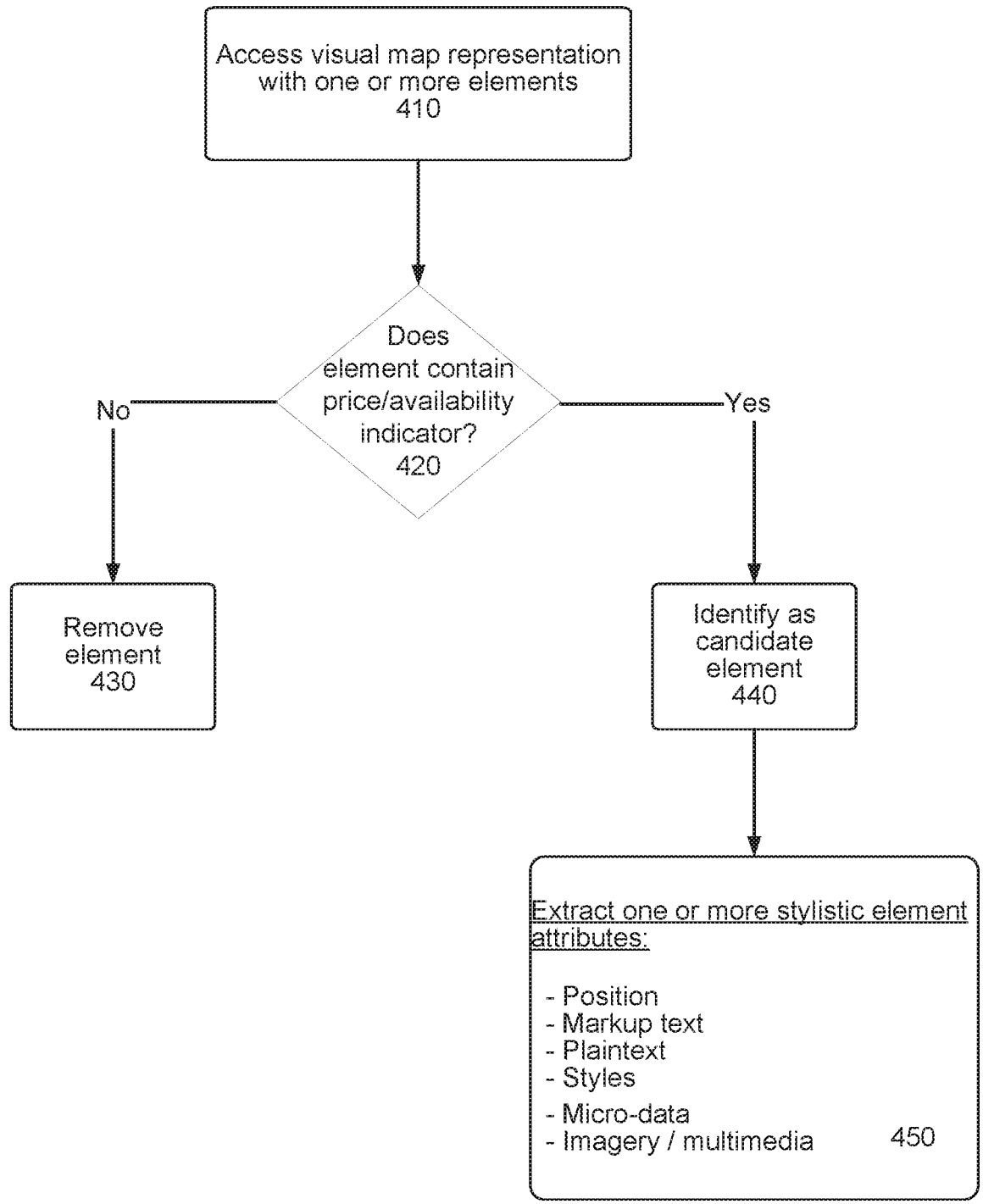
FIG. 4 is a flowchart of an example process for identifying candidate elements for pricing or availability determination of the e-commerce entity.

FIG. 4 is a flowchart of an example process 400 for identifying candidate elements for entity pricing or entity availability determination. Candidate elements are identified from the visual map representation of the web page. Candidate elements related to entity pricing information are referred to as candidate pricing elements, and candidate elements related to entity availability are referred to as candidate availability elements. Candidate elements are those elements of the web page that include certain characteristics that are typically associated with pricing elements or availability elements. For example, candidate pricing elements include a currency symbol such as dollar symbol (i.e., $) and candidate availability elements include string of characters such as "add to cart," or "buy." In one embodiment, the below described example process is repeated for each element of the web page to identify whether the element is a candidate pricing element or a candidate availability element.

The server accesses 410 the visual map representation of the web page that includes one or more elements of the web page. The elements may relate to pricing information, availability information, or some other information of the entity. The server inspects the elements to identify the elements that are either candidate pricing elements or candidate availability elements. To identify candidate pricing elements, the server checks 420 whether the element contains a stylistic pricing identifier such as price labels 332, price identifiers 334, or price modifiers 336. If the server determines that the element does not contain a stylistic pricing identifier, the server removes 430 the element from consideration as a candidate pricing element. On the other hand if the server determines that the element contains at least one stylistic pricing identifier (i.e., one of a price label, price identifiers, or price modifier), the server identifies 440 the element as a candidate pricing element. For example, the server identifies the element as a candidate pricing element if the element contains a currency symbol such as a dollar symbol (i.e., $).

The server identifies candidate availability elements by checking 420 whether the element contains a stylistic availability identifier such as 'add to cart,' 'buy,' 'availability,' 'status,' 'in-stock,' or 'out-of-stock. If the server determines that the element does not contain an stylistic availability identifier, the server removes 430 the element from consideration as a candidate availability element. On the other hand if the server determines that the element contains at least one stylistic availability identifier, the server identifies 440 the element as a candidate availability element. For example, the server identifies the element as a candidate availability element if the element contains a string of characters such as 'add to cart' or 'buy.'

In one embodiment, the server extracts 450 information associated with the element after the element is identified as a candidate pricing element or a candidate availability element. The server extracts information associated with one or more stylistic heuristic attributes (also referred to as "stylistic attributes") of the element such as, but not limited to, position, markup text, plaintext, styles, micro-data, and imagery/multimedia. For example, the server extracts metadata associated with one or more of: position, markup text, plaintext, styles, micro-data, and imagery/multimedia.

In one example embodiment, the server extracts 450 information associated with the element even before the server determines whether the element is a candidate pricing element or a candidate availability element. In this embodiment, the server identifies 440 the element as a candidate pricing element or a candidate availability element after determining that the element contains pricing/availability identifiers and based on one or more stylistic heuristic attributes of the element, for example, position within the visual map, price value, font size, text length, text style, and text content.

Referring back to FIG. 2, the server analyzes 240 the one or more candidate elements to determine a likelihood that the one or more candidate elements is a pricing element or an availability element of the entity. An example process of analyzing 240 candidate elements is described below in further detail with reference to FIG. 5.

Example Analysis of Candidate Elements

Figure 5:
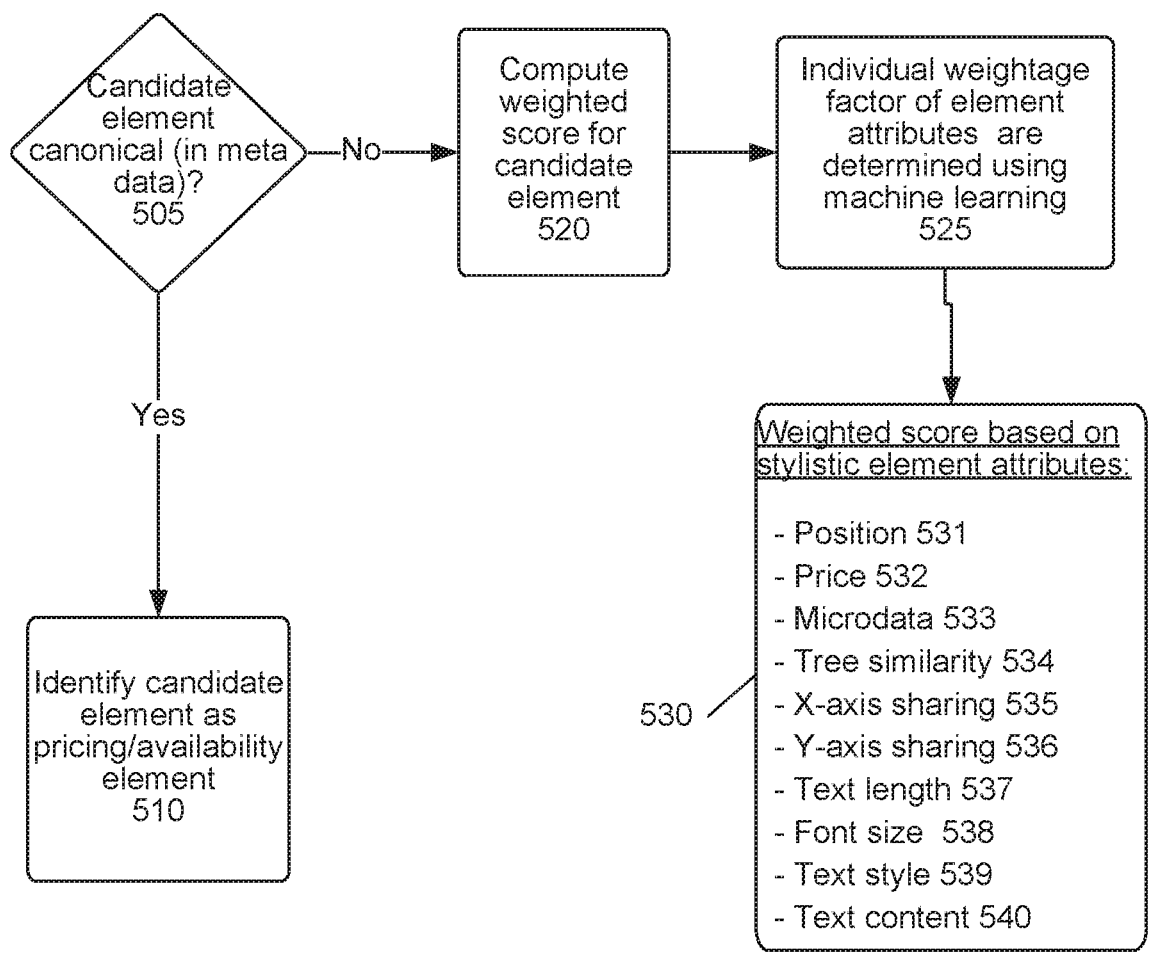
FIG. 5 is a flowchart of an example process for analyzing candidate elements to determine a likelihood that the candidate elements represent pricing or availability elements of the e-commerce entity.

FIG. 5 is a flowchart of an example process 500 for analyzing candidate elements to determine a likelihood that the candidate elements represent entity pricing or entity availability elements. The identified candidate elements of the web page are analyzed such that a candidate pricing element is selected as a price element of the entity and/or a candidate availability element is selected as representing an availability status of the entity. The below described example process 500 describes analyzing one candidate element (i.e., either a candidate pricing element or a candidate availability element) to determine a likelihood that the candidate element represents entity pricing element or entity availability element. In one embodiment, the below described example process 500 is repeated for multiple candidate elements of the web page (e.g., all candidate elements) to determine a likelihood that the multiple candidate elements represent an entity pricing element or entity availability element.

The server determines 505 whether the candidate element is canonical in metadata as either a pricing element or an availability element. A candidate element is canonical in metadata as a pricing element, for example, if the candidate element contains the stylistic attributes that convey the entity details and the entity pricing. Example stylistic attributes for a candidate element to be canonical as a pricing element are currency symbol and a price amount. A candidate element is canonical in metadata as an availability element, for example, if the candidate element contains the stylistic attributes that convey the entity details and the entity availability. An example stylistic attribute for a candidate element to be canonical as an availability element is "in-stock." Alternatively, a candidate element may be considered to be canonical if its web page returns a specific page response status code such as '404' representing that the entity is no longer available.

In one embodiment, a candidate element being canonical as a pricing element (or an availability element) typically signifies that the entity's web page includes only one entity. A web page with more than one entities does not contain candidate elements that are canonical as either a pricing element or an availability element. Upon determining that the candidate element is canonical in metadata as either a pricing element or an availability element, the server identifies 510 the candidate element as either the pricing element or availability element of the entity. In one embodiment, upon determining that the candidate element is canonical in metadata, and identifying the element as candidate element, the process ends.

In one embodiment, the server determines 505 whether the candidate element is canonical in metadata as either a pricing element or an availability element while identifying 230 candidate elements. For example, the server may determine 505 whether the candidate element is canonical in metadata while the server determines 420 that the element contains at least one stylistic pricing/availability identifier.

Upon determining that the candidate element is not canonical in metadata as either a pricing element or an availability element, the server uses a machine learning model to determine a likelihood that the candidate element is either a pricing element or an availability element. A machine learning model deals with a study of systems that may learn from data they are operating on, rather than follow only explicitly programmed instructions like in a rules-based model. For a candidate element, the machine learning model receives a plurality of stylistic pricing/availability attributes of the candidate element and outputs a likelihood that the candidate element is the pricing/availability element. In one embodiment, the process of receiving stylistic attributes for each candidate element to output a likelihood is repeated for each candidate element.

Machine learning may be implemented using supervised learning, where the model is presented with a data set of example element attribute inputs and their desired outputs such that model may develop a general rule that maps any input to an output. The process of supervised learning may be implemented for two machine learning models, where the first model develops a general rule related to entity pricing and the second model develops a general rule related to entity availability. After machine learning models are trained with training data sets, each of the models may be presented with the plurality of stylistic attributes of the candidate element. In response, each machine learning model outputs a likelihood that the candidate element is a pricing element or an availability element of the entity. Alternatively, machine learning may be implemented using unsupervised learning, where the model is presented with a data set of example element attribute inputs but without giving their desired outputs. Accordingly, the machine learning model in the unsupervised learning is left on its own to develop a general rule that maps any input to an output.

In one embodiment, the server computes 520 a weighted score for the candidate element using machine learning model. For example, the score is computed using weighting factors for each stylistic attribute of the element and the weighting factors may be determined 525 using machine learning. The stylistic attributes 530 of the candidate element that are used in computing a weighted score include: position 531, price 532, microdata 533, tree similarity 534, X-axis sharing 535, Y-axis sharing 536, text length 537, font size 538, text style 539, and text content 540. An example weighting factor methodology of the stylistic attributes is given below for reference:

- position within the visual map representation: promote (e.g., increase weighted score) if the position is below or equal to a threshold position; penalize (e.g., decreases weighted score) if the position is above the threshold position. Example threshold position is the top 200 pixels of the web page;
- X-axis or Y-axis sharing: penalize if the position of the candidate element on the visual map representation has a same coordinate as another candidate element in either a horizontal axis (i.e., X-axis) or vertical axis (i.e., Y-axis);
- price value relative to price values of other elements: promote if the price value is below a threshold price value; penalize if the price value is above or equal to the threshold price value. Example threshold price value is computed analyzing pricing information (e. g., average price value) for all candidate elements of the visual map representation;
- price attribute markup data (microdata): promote if the candidate element is decorated with price attributes in markup. Example price attributes in markup is a price value that with a strikethrough indicating that the price value of the entity is likely reduced;
- tree similarity or hierarchical address to retrieve the candidate element: penalize if the candidate element has a similar address selection path as that of other candidate elements. Example candidate element paths that are do not have very similar hierarchical address include the following: element 1 with an address 'body # content .related-items .el .avail' and element 2 with an address 'body # content # main .avail.' The tree similarity would be relatively low for these two elements even though they start and end with similar descriptors, they diverge in the middle of their paths in such a way that makes them unique;
- text length: promote if the text length is above a threshold length; penalize if the text length is below or equal to the threshold length. Example threshold length is computed analyzing text length (e. g., average text length) for all candidate elements of the visual map representation;
- font size: promote if a ratio of the candidate element's font size compared to a maximum font size of all candidate elements of the web page is above a threshold value; penalize if the ratio is below or equal to the threshold value. Example threshold ratio value is computed analyzing font size (e. g., average font size) for all candidate elements of the visual map representation;
- text style: promote if the text style of the candidate element is weighted (e.g., bold or black); penalize if the text style includes a strikethrough style; and
- text content: penalize if the text contents includes certain specific phrases that indicate retailer-relevant information instead of product-relevant information such as, for example, "shipping," "free," "original," "promotions," "general discounts," "additional fees" and the like.

In one embodiment, the weighted score of the candidate element may be computed using rule-based engine instead of machine learning. A rules-based model comprises one or more rules that are explicitly programmed instructions for computing the weighted score for the candidate element. For a given candidate element, the rules-based model receives the plurality of stylistic attributes of the candidate element and outputs a weighted score based on instructions associated with the one or more rules. After the weighted score is computed, the server determines a likelihood that the candidate element is either a pricing/availability element using machine learning or rules-based model.

In one embodiment, the process of computing the weighted score and determining a likelihood is repeated for each candidate element that is not canonical as either pricing element or availability element. Referring back to FIG. 2, the server selects 250 a candidate element as the pricing element or an availability element based on the determined likelihood. In one embodiment, the server selects the candidate element with the highest likelihood. Alternatively, the server selects one or more candidate elements with a likelihood above a threshold likelihood, and selects a candidate element within the one or more candidates.

In one embodiment, after selecting the candidate element as a pricing/availability element of the entity, the server provides the pricing information associated with the pricing/availability element of the entity (i.e., the selected candidate element) to a device for presenting the pricing/availability information to the user of the device, where the information is sent to an account associated with the user. Alternatively or additionally, the server imports pricing/availability information associated with the pricing element of the entity and stores such information in the user's repository.

In one embodiment, the web page of the entity of interest contains more than one entity for purchase. In such scenario, the server may select a second candidate element as a pricing/availability element for an additional entity, where the additional entity is related to the entity of interest. Here, the entity of interest is the entity that the user is interested in and saved in the repository. In other words, the server may select the second candidate element as the pricing/availability element for the additional entity even though the user did not express an interest in the additional entity. Example relationship between the entity of interest and the additional entity is such that the additional entity is at least one of: a useful addition to the entity of interest (e.g., cross-selling), a more expensive version of the entity of interest (e.g., up-selling), and a less expensive version of the entity of interest (e.g., down-selling).

In one embodiment, the user's repository indicates that the user is interested in two or more entities that are located on two or more different web pages of the same website. For example, a user might be interested in buying a dress shirt located on a first web page on a JCREW website, and a pair of pants on a second web page on the JCREW website. Alternatively or additionally, the user's repository indicates that the user is interested in two or more entities that are located on two or more distinct domains of websites. For example, a user might be interested in buying a dress shirt located on the JCREW website, and a pair of pants located on a MACYS website.

Example Machine Architecture

Figure 6:
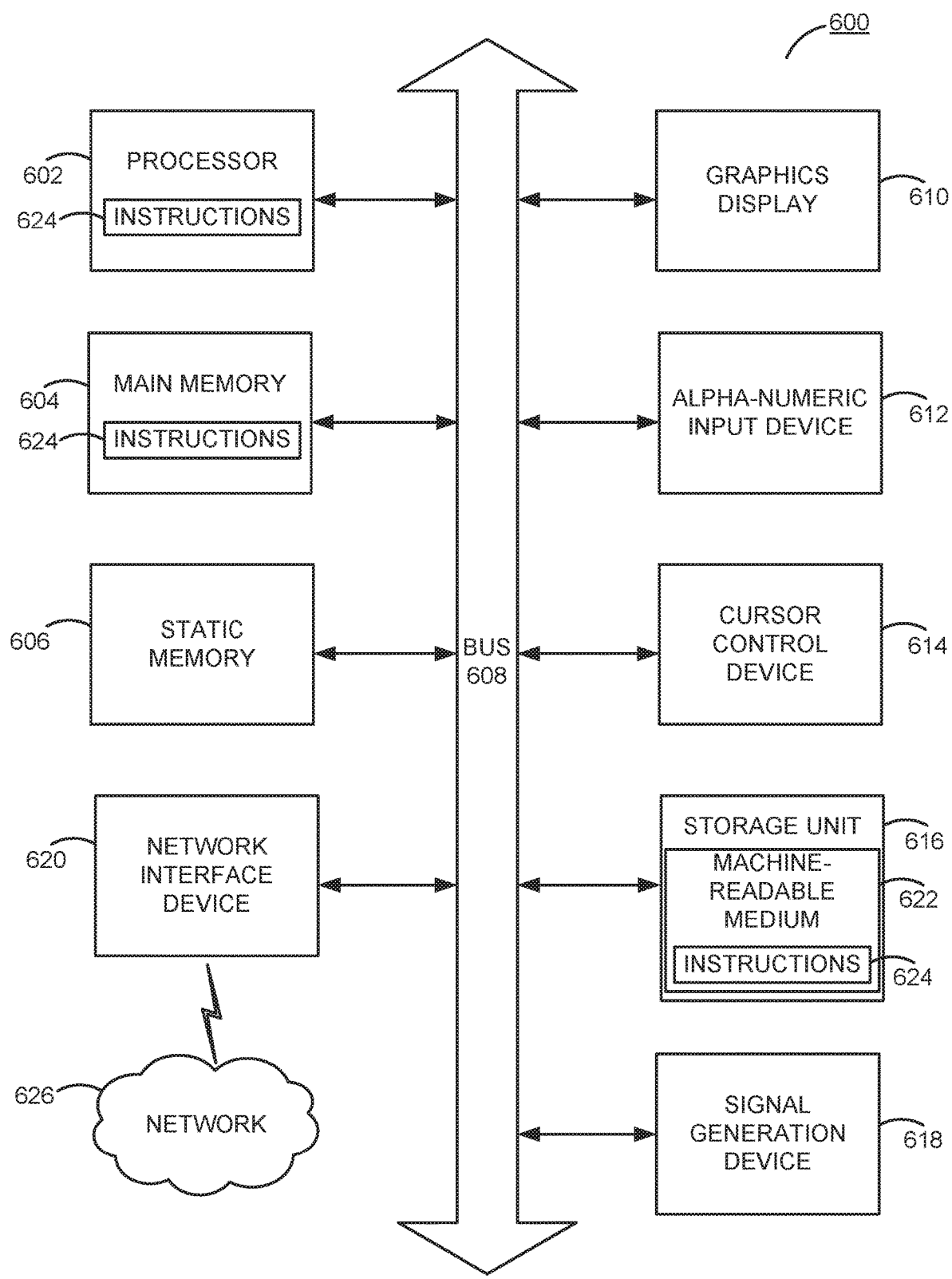
FIG. 6 illustrates components of an example machine that may read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 may be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 600 may include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The method for determining entity pricing/availability as disclosed herein provides several benefits and advantages such as, for example, to provide an indication to the user whether the entity of interest at the specified web page is available for purchase at a later time than when the user added the entity to the repository; to provide up-to-date pricing information for the entity of interest to the user; and to extract the necessary entity information to determine entity pricing/availability for all entities of interest that the user saved in the user's repository, where the entities may be located on different domains of e-commerce websites.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments that are described herein include logic or a number of components, modules, or mechanisms, for example, as illustrated in FIGS. 1 and 6. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA)

or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for determining entity pricing and availability based on stylistic heuristics through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for determining an entity characteristic, the method comprising:
   accessing, by a computer, a web page including information associated with an entity, the entity representing a product or service available for purchase at the web page;
   executing, by the computer, the source code associated with the web page to generate one or more elements of the web page;
   generate a visual map representation of the one or more elements of the web page, the visual map representation includes stylistic identifiers for the one or more elements, the visual map comprising a coordinate grid that represents each of the one or more elements at a unique position on the coordinate grid;

computing, by the computer, one or more Euclidean vector distances between the one or more elements in the visual map representation using vector algebraic operations on the positions of each of the one or more elements on the coordinate grid of the visual map representation, each Euclidean vector distance indicating a relative magnitude of distance and direction between pairs of the one or more elements in the visual map representation;

identifying one or more candidate elements for the entity characteristic, the one or more candidate elements identified from the one or more elements of the visual map representation;

determining, for each candidate element of the one or more candidate elements, a likelihood that the candidate element is a characteristic element of the entity based at least on the Euclidian vector distances between the candidate element and the other candidate elements of the one or more candidate elements; and selecting a candidate element of the one or more candidate elements as the characteristic element of the entity by analyzing the determined likelihood of the one or more candidate elements.

2. The computer-implemented method of claim 1, further comprising:
providing information associated with the characteristic element of the entity to a device for presenting the provided information to a user of the device.

3. The computer-implemented method of claim 1, further comprising:
importing information associated with the characteristic element of the entity for storing in a repository associated with a user.

4. The computer-implemented method of claim 1, wherein the entity characteristic is at least one of: pricing information of the entity and availability status of the entity.

5. The computer-implemented method of claim 4, wherein the one or more candidate elements associated with entity pricing are identified by analyzing text of the one or more elements to identify candidate elements comprising a currency symbol and a number.

6. The computer-implemented method of claim 4, wherein the one or more candidate elements associated with entity availability are identified by analyzing text of the one or more elements to identify candidate elements comprising phrases 'add to cart' or 'buy'.

7. The computer-implemented method of claim 1, wherein the stylistic identifiers comprising at least one of: price labels, price identifiers, price modifiers, and availability identifiers.

8. The computer-implemented method of claim 1, wherein the likelihood that the candidate element is the entity's characteristic element is determined by:
computing a weighted score for the candidate element, the weighted score comprising a plurality of components corresponding to a plurality of stylistic attributes of the candidate element, each of the plurality of stylistic attributes comprising a weighting factor; and
comparing the weighted score with a threshold score.

9. The computer-implemented method of claim 8, wherein the plurality of stylistic attributes of the candidate element comprises at least two or more of: position within the visual map representation, price value, hierarchical address to retrieve the candidate element, font size, text length, text style, and text content.

10. The computer-implemented method of claim 9, wherein the weighting factor associated with the position within the visual map representation increases the weighted score if the position of the candidate element is above a threshold position within the visual map representation, and decreases the weighted score if the position is below or equal to the threshold position.

11. The computer-implemented method of claim 9, wherein the weighting factor associated with the position within the visual map representation decreases the weighted score if the position of the candidate element has a same coordinate with another candidate element in either a horizontal axis or a vertical axis.

12. The computer-implemented method of claim 9, wherein the weighting factor associated with the price value of the candidate element increases the weighted score if the price value is below a threshold price, and decreases the weighted score if the price value is above or equal to the threshold price, the threshold price is computed by analyzing price information for all candidate elements of the visual map representation.

13. The computer-implemented method of claim 9, wherein the weighting factor associated with the hierarchical address of the candidate element decreases the weighted score if the hierarchical address is similar to a hierarchical address of another candidate element of the visual map representation.

14. The computer-implemented method of claim 9, wherein the weighting factor associated with the font size of the candidate element increases the weighted score if a ratio of the font size of the candidate element to a maximum font size of the visual map representation is above a threshold value, and decreases the weighted score if the ratio is below or equal to the threshold value.

15. The computer-implemented method of claim 9, wherein the weighting factor associated with the text length of the candidate element increases the weighted score if a ratio of the text length of the candidate element to a length of a display container that comprises the text of the candidate element is above a threshold value, and decreases the weighted score if the ratio is below or equal to the threshold value.

16. The computer-implemented method of claim 9, the weighting factor associated with the text style of the candidate element increases the weighted score if the text style comprises bold text, and decreases the weighted score if the text style comprises strikethrough text.

17. The computer-implemented method of claim 9, the weighting factor associated with the text context decreases the weighted score if the text of the candidate element comprises at least one of: shipping, original, and free.

18. The computer-implemented method of claim 1, wherein determining the likelihood that the candidate element is the characteristic element is implemented by a rules engine comprising one or more rules.

19. The computer-implemented method of claim 1, wherein determining the likelihood that the candidate element is the characteristic element is implemented by a machine learning model that receives the plurality of stylistic attributes of the candidate element and outputs a likelihood that the candidate element is the characteristic element.

20. The computer-implemented method of claim 1, wherein selecting the candidate element as the characteristic element of the entity comprises selecting the candidate element comprising canonical metadata for the entity's characteristic information.

21. The computer-implemented method of claim 1, further comprising:
selecting a second candidate element as a characteristic element for an additional entity, the additional entity related to the entity and the second candidate element selected based on the relationship between the entity and the additional entity.

22. The computer-implemented method of claim 21, wherein the additional entity is at least one of: a useful addition to the entity, a more expensive version of the entity, and a less expensive version of the entity.

23. The computer-implemented method of claim 1, wherein the entity represents a configurable product comprising at least one stylistic attribute of: size, color, size type, size system, age group, gender, and product category.

24. The computer-implemented method of claim 1, wherein the entity represents at least one of: a product without physical manifestation, a product downloadable from a network, a product representing a subscription service, and a product representing a digital gift.

25. The computer-implemented method of claim 1, wherein the entity represents a group of products and the selected candidate element represents a bundled price for the group of products.

26. A system for determining an entity characteristic, the system comprising:
a network interface device configured to access a web page including information associated with an entity, the entity representing a product or service available for purchase at the web page;
a processor configured to:
execute the source code associated with the web page to generate one or more elements of the web page;
generate a visual map representation of the one or more elements of the web page, the visual map representation includes stylistic identifiers for the one or more elements, the visual map comprising a coordinate grid that represents each of the one or more elements at a unique position on the coordinate grid;
compute, by the computer, one or more Euclidean vector distances between the one or more elements in the visual map representation using vector algebraic operations on the positions of each of the one or more elements on the coordinate grid of the visual map representation, each Euclidean vector distance indicating a relative magnitude of distance and direction between pairs of the one or more elements in the visual map representation;
identify one or more candidate elements for the entity characteristic, the one or more candidate elements identified from the one or more elements of the visual map representation;
determine, for each candidate element of the one or more candidate elements, a likelihood that the candidate element is a characteristic element of the entity based at least on the Euclidean vector distances between the candidate element and the other candidate elements of the one or more candidate elements; and
select a candidate element of the one or more candidate elements as the characteristic element of the entity by analyzing the determined likelihood of the one or more candidate elements.

27. A non-transitory computer readable storage medium configured to store instructions, the instructions when executed by a processor cause the processor to:
access, by a computer, a web page including information associated with an entity, the entity representing a product or service available for purchase at the web page;
execute, by the computer, the source code associated with the web page to generate one or more elements of the web page;
generate a visual map representation of the one or more elements of the web page, the visual map representation includes stylistic identifiers for the one or more elements, the visual map comprising a coordinate grid that represents each of the one or more elements at a unique position on the coordinate grid;
compute, by the computer, one or more Euclidean vector distances between the one or more elements in the visual map representation using vector algebraic operations on the positions of each of the one or more elements on the coordinate grid of the visual map representation, each Euclidean vector distance indicating a relative magnitude of distance and direction between pairs of the one or more elements in the visual map representation;
identify one or more candidate elements for the entity characteristic, the one or more candidate elements identified from the one or more elements of the visual map representation;
determine, for each candidate element of the one or more candidate elements, a likelihood that the candidate element is a characteristic element of the entity based at least on the Euclidian vector distances between the candidate element and the other candidate elements of the one or more candidate elements; and
select a candidate element of the one or more candidate elements as the characteristic element of the entity by analyzing the determined likelihood of the one or more candidate elements.

* * * * *